US006981143B2

(12) United States Patent
Mullen et al.

(10) Patent No.: US 6,981,143 B2
(45) Date of Patent: Dec. 27, 2005

(54) SYSTEM AND METHOD FOR PROVIDING CONNECTION ORIENTATION BASED ACCESS AUTHENTICATION

(75) Inventors: Shawn P. Mullen, Buda, TX (US); Gerald F. McBrearty, Austin, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 09/996,132

(22) Filed: Nov. 28, 2001

(65) Prior Publication Data

US 2003/0101338 A1 May 29, 2003

(51) Int. Cl.[7] .............................................. H04L 9/00

(52) U.S. Cl. ...................... 713/166; 713/168; 713/182; 713/189; 713/200; 713/201

(58) Field of Search ............................... 713/166, 168, 713/182, 189, 200, 201

(56) References Cited

U.S. PATENT DOCUMENTS

| | | | | | |
|---|---|---|---|---|---|
| 5,812,819 A | * | 9/1998 | Rodwin et al. | ............... | 703/23 |
| 5,848,233 A | * | 12/1998 | Radia et al. | ................ | 713/201 |
| 5,884,024 A | * | 3/1999 | Lim et al. | ................... | 713/201 |

* cited by examiner

*Primary Examiner*—Thomas R. Peeso
(74) *Attorney, Agent, or Firm*—Marilyn S. Dawkins; Edmond A. DeFrank

(57) ABSTRACT

The present invention is embodied in a system and method for providing access authentication of users attempting to gain access to a network based on connection orientation parameters to prevent security breaches of the network. In general, after a connection is requested to gain access to a networked computer, all router addresses through which the request went is gathered and compared to a well-known set of firewall router addresses (for example, of known companies) to determine the validity of the request. If one of the gathered addresses match the well-known set of firewall address, the request is deemed to have come from the other side of the firewall and the connection is denied. As such, in an intranet networking environment that uses a firewall, the present invention will provide computer users of the intranet protection from unauthorized access by others that do not have access past the firewall.

18 Claims, 7 Drawing Sheets

SYSTEM AND METHOD FOR PROVIDING CONNECTION ORIENTATION BASED ACCESS AUTHENTICATION

BACKGROUND OF THE INVENTION

1. Field of the Invention

The present invention relates in general to computer network security, and in particular, to a system and method for providing access authentication of users attempting to gain access to a network based on connection orientation parameters to prevent security breaches of the network.

2. Related Art

The development of computerized distributed information resources, such as the Internet, allows users to link with servers and networks, and thus retrieve vast amounts of electronic information heretofore unavailable in an electronic medium. Such electronic information increasingly is displacing more conventional means of information transmission, such as newspapers, magazines, and event television. The term Internet is and abbreviation for "Inter-network", and refers commonly to a collection of computer networking. TCP/IP is an acronym for, Transport Control Protocol/Internet Protocol, a software protocol developed by the Department of Defense for communication between computers.

Internet services are typically accessed by specifying a unique address, a universal resource locator (URL). The URL has two basic components, the protocol to be used, and the object pathname. For example, the URL http://www.ibm.com (home page for International Business Machines—IBM) specifies a hypertext transfer protocol ("http") and a path name of the server ("www.ibm.com"). The server name is associated with a unique numeric value (a TCP/IP address, or "domain").

The Internet has rapidly become a valuable source of information to all segments of society. In addition to commercial enterprises utilizing the Internet as an integral part of their marketing efforts in promoting their products or services, many federal, state, and local government agencies are also employing Internet sites for informational purposes, particularly agencies which must interact with virtually all segments of society, such as the IRS. The information provided is often updated regularly to keep users current with changes which may occur from time to time.

The World Wide Web (WWW or Web) is a graphic, interactive interface for the Internet. There are different programs that facilitate user scanning and selecting at this interface. The interaction is called browsing, and programs (web browser clients) on a data processing system (which may be a computer) perform this function. A data processing system connected to the Web may access a server (a program on another data processing system) also connected to the Web.

The program on the server is generally termed a "web site". Web sites are a collection of "web pages", where web pages are graphic displays, which are usually linked together, and may be downloaded to a data processing system utilizing a browser client. Each web page has a URL within the Web that is accessible by utilizing TCP/IP transactions via telecommunication networks and a modem. The address allows Internet browser clients to connect and communicate with a Hypertext Transfer Protocol (HTTP) server over the Web.

Retrieval of information on the Web is generally accomplished with a hypertext markup language (HTML) compatible browser. This is an application program capable of submitting a request for information identified by a URL at the client machine. The information is provided to the client formatted according the HTML.

Each Web address (www) specifies or implies a reference to one particular site on the Internet. This means that without some kind of additional machinery, when ever a person requests a specific www address, no matter the location or the number of other simultaneous requests, the call will be made to that specific site.

As the Internet and its underlying technologies have become increasingly pervasive, attention has focused on Internet security and computer network security in general. There has been an increase in the unauthorized opportunity to gain access to data, change data, destroy data, use computer resources, etc. Many networks are secured with a security perimeter. Machines within the security perimeter have ready access to data stored in the secure network. The security perimeter may be defined by firewall software, routing limitations, encryption, virtual private networks and/or other means. Firewalls are intended to shield data and resources from network intruders.

In general, a firewall is a gatekeeping computer that is connected between the Internet and the private intranet. The firewall protects the private intranet by filtering traffic to and from the Internet based on network policies. Typically, the firewall provides a single check point where network traffic can be audited. Most firewalls can be classified as either a packet filtering firewall or a proxy based application gateway firewall.

Packet filtering firewalls (packet filters) are typically implemented in routers. The routers use tables to indicate communication protocols allowing into and out of a particular network. Such packet filters, drop, reject or permit passage of packets of information based on destination address, source address, and application port numbers. Packet filters do not maintain context or understand the applications with which they are dealing. They make decisions purely by looking at Internet Protocol (IP) headers and interpreting the rules they are programmed to follow. The reliance of packet filters on header information allows unauthorized users to mimic the IP address of trusted machines and thereby gain unauthorized access. Thus, packet filtering firewalls are susceptible to security breaches.

One solution is to use another type of firewall, namely, a proxy based application gateway firewall (also known as an application firewall, or proxy firewall). This firewall runs programs called proxies, or proxy software, that secure information flowing through a gateway. All Internet traffic is funneled through a gateway controlled by proxy software. The proxy software transfers incoming information to an internal network based on the access rights of individual users.

Because proxy software is typically an application program, it makes its decision based on context, authorization and authentication rules, and does not depend on the IP address alone. Typically, proxy firewalls operate at the highest level of the protocol stack. They allow a private intranet systems analyst to implement security policies based on a wide range of defensive measures.

However, many firewalls do not extend far enough into an organization's intranet of computers, which can compromise security of that organization. Therefore, what is needed is a system and method to extend network security beyond the firewall and onto all computers on an intranet.

SUMMARY OF THE INVENTION

To overcome the limitations in the prior art described above, and to overcome other limitations that will become apparent upon reading and understanding the present specification, the present invention is embodied in a system and method for providing access authentication of users attempting to gain access to a network based on connection orientation parameters to prevent security breaches of the network.

In general, after a connection is requested to gain access to a networked computer, all router addresses through which the request went is gathered and compared to a well-known set of firewall router addresses (for example, of known companies) to determine the validity of the request. If one of the gathered addresses match the well-known set of firewall address, the request is deemed to have come from the other side of the firewall and the connection is denied. As such, in an intranet networking environment that uses a firewall, the present invention will provide computer users of the intranet protection from unauthorized access by others that do not have access past the firewall.

In one embodiment, for an intranet with a known firewall IP address, when a connection request is received for an incoming data packet, a traceroute can be initiated to find all routers through which the request went. If any of the routers' IP address is the intranet's firewall IP address, then it can be assumed that the request came from the outside the firewall. This indicates that there has been a possible breach of security and the connection can be refused or an alert can provided to the intranet user showing the traceroute and allowing the user to make the decision on whether to allow connection or not.

Since the current method and system uses access authentication based on connection orientation to prevent security breaches, it provides a security check without burdening the computers in the network with the heavy security layer of the firewall and overcomes the vulnerability of single point failure.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Exemplary Environment

Figure 1:
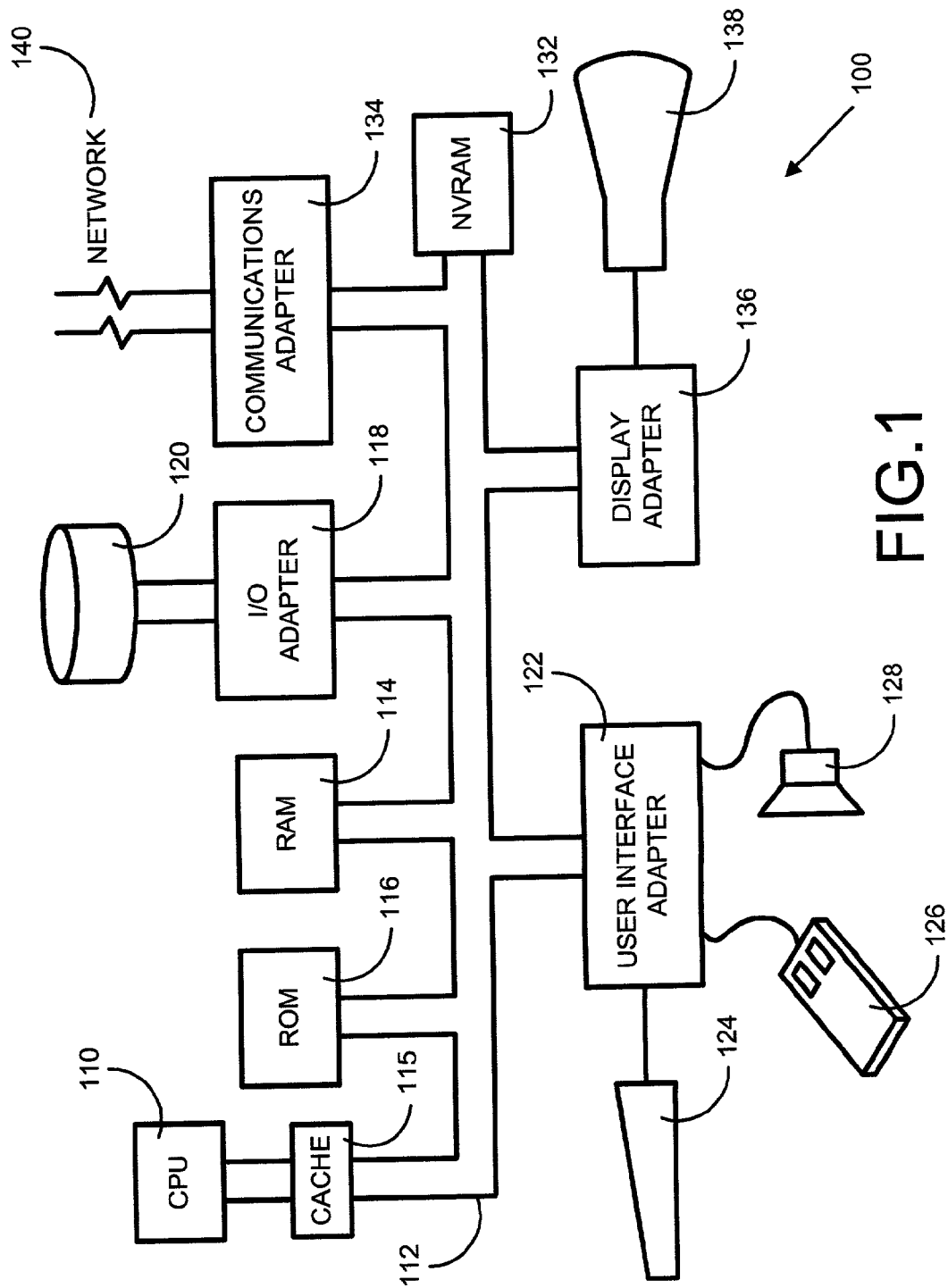
FIG. 1 illustrates a conventional hardware configuration for use with the present invention.

The preferred embodiments may be practiced in any suitable hardware configuration that uses a networked connection, such as computing system 100 illustrated in FIG. 1 or, alternatively, in a laptop or notepad computing system. Computing system 100 includes any suitable central processing unit 110, such as a standard microprocessor, and any number of other objects interconnected via system bus 112.

For purposes of illustration, computing system 100 includes memory, such as read only memory (ROM) 116, random access memory (RAM) 114, and peripheral memory devices (e.g., disk or tape drives 120) connected to system bus 112 via I/O adapter 118. Computing system 100 further includes a display adapter 136 for connecting system bus 112 to a conventional display device 138. Also, user interface adapter 122 could connect system bus 112 to other user controls, such as keyboard 124, speaker 128, mouse 126, and a touchpad (not shown).

One skilled in the art readily recognizes how conventional computers and computer programs operate, how conventional input device drivers communicate with an operating system, and how a user conventionally utilizes a input devices to initiate the manipulation of objects in a graphical user interface.

A graphical user interface (GUI) and operating system (OS) of the preferred embodiment reside within a computer-readable media and contain device drivers that allows one or more users to initiate the manipulation of displayed object icons and text on a display device. Any suitable computer-readable media may retain the GUI and operating system, such as ROM 116, RAM 114, disk and/or tape drive 120 (e.g., magnetic diskette, magnetic tape, CD-ROM, optical disk, or other suitable storage media).

In the preferred embodiments, the COSE.TM. (Common Operating System Environment) desktop GUI interfaces the user to the AIX.TM. operating system. The GUI may be viewed as being incorporated and embedded within the operating system. Alternatively, any suitable operating system or desktop environment could be utilized. Examples of other GUIs and/or operating systems include X11.TM. (X Windows) graphical user interface, Sun's Solaris.TM. operating system, and Microsoft's Windows 95.TM. operating system. While the GUI and operating system merely instruct and direct CPU 110, for ease in explanation, the GUI and operating system will be described as performing the following features and functions.

II. General Overview of the Components

Figure 2:
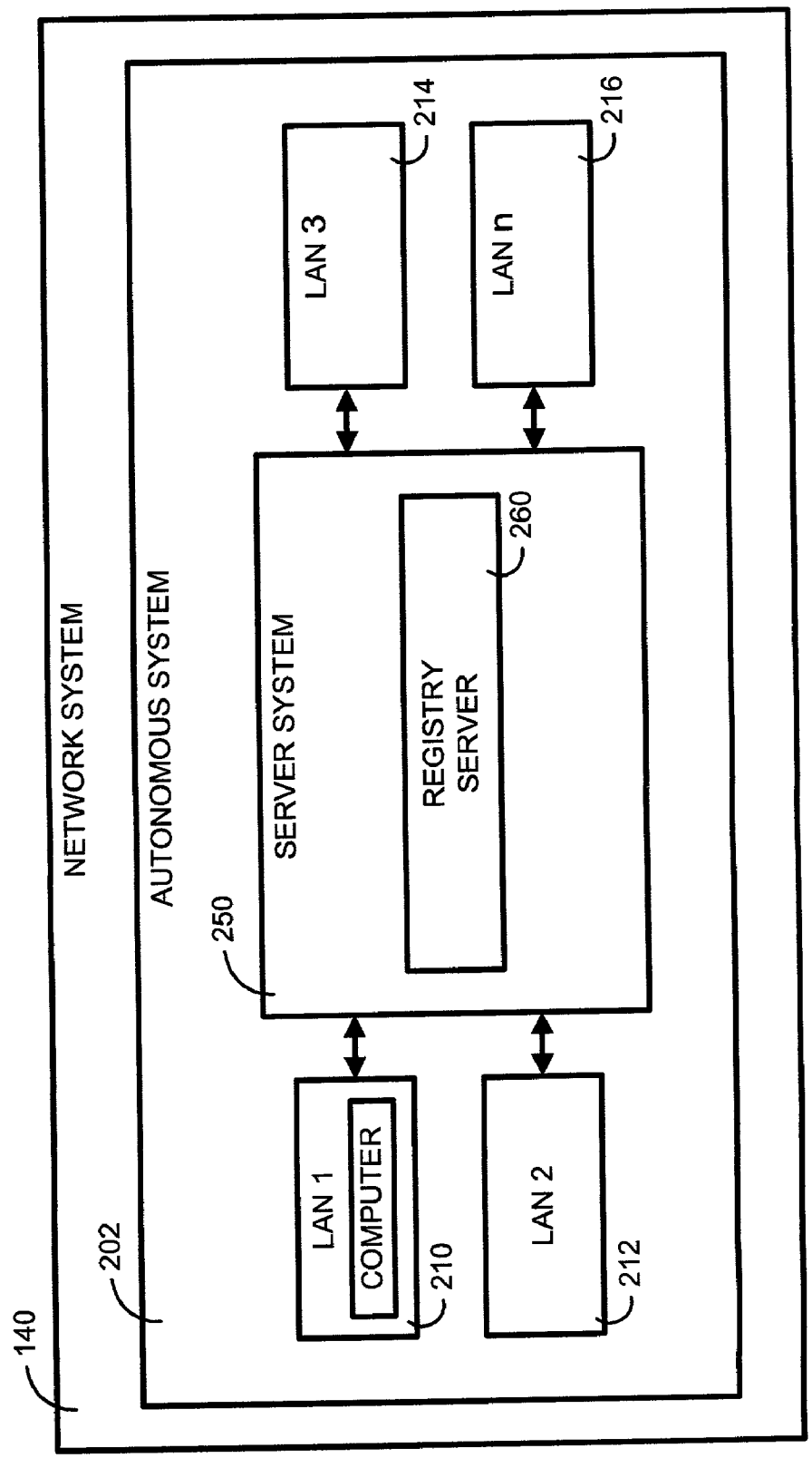
FIG. 2 is a block diagram showing the general components of the present invention.

FIG. 2 illustrates how the computing system 100 may be located in a local area network (LAN), which is part of an autonomous system 202 within a network system 140. The network system 140 could be linked to the Internet or an intranet. The autonomous system 202 includes LAN 1-n, 210, 212, 214, 216, which are linked through the network 140 to a server system 250. This system provides for a system for filing addresses, a registry server 2800.

Figure 3:
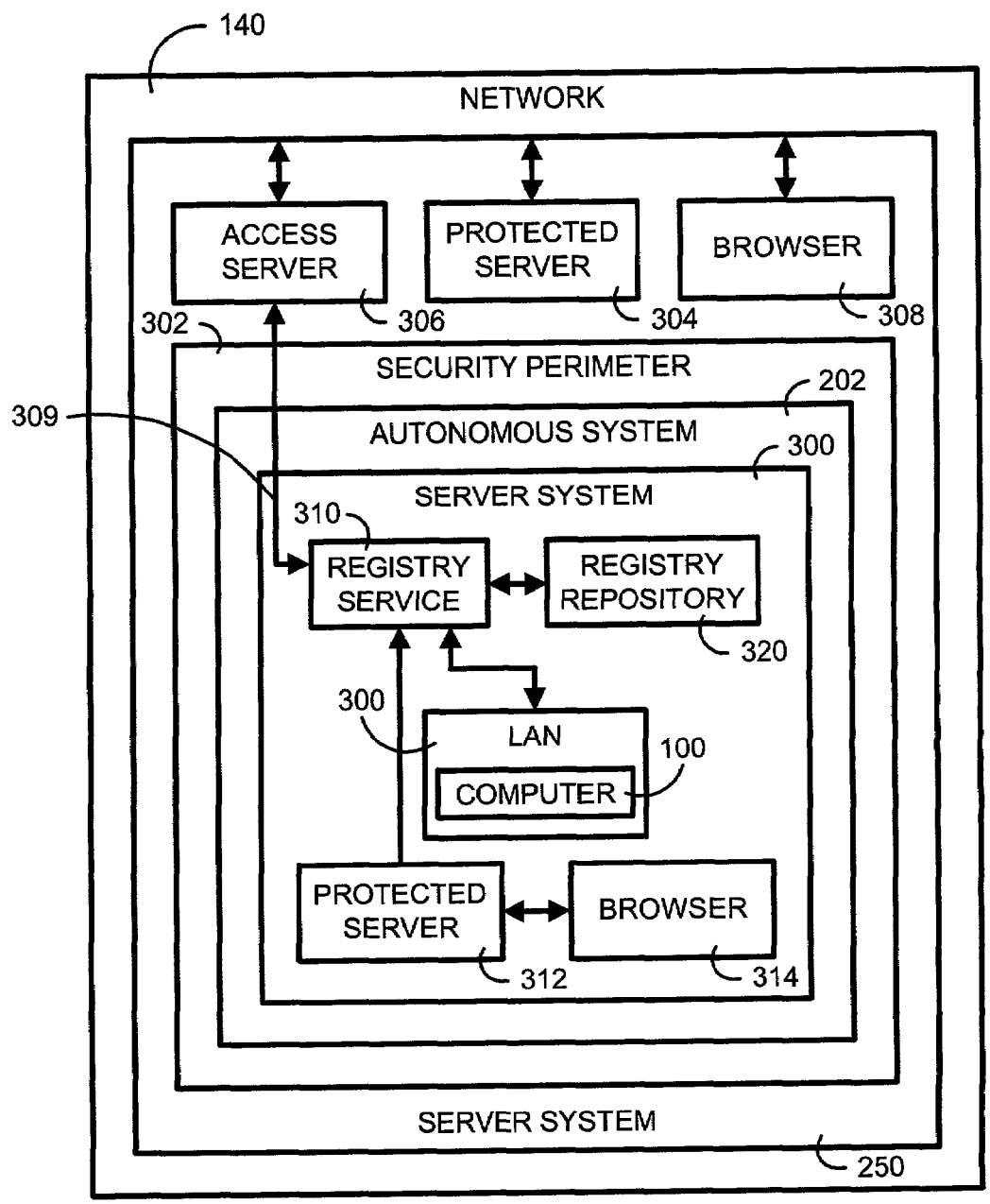
FIG. 3 is a block diagram of the main elements of an information access system

FIG. 3 along with FIGS. 1 and 2 shows how a server system 250 is integrated with the network 140 in an information access system 300. A user invokes a client program on their computer 100, and this client program contacts a server on a remote computer. The information access system has a plurality of components including an access server 306, registry server 310, a host computer 100 and integration tools 315. These components cooperate to control access to resources stored on one or more protected servers 304, 312. Generally, in an Internet computing environment, a protected server is used as a World Wide Web (WWW) server. Users are registered in the system, either internally or externally and components may be housed on separate computers.

The registry server 310 may be part of a secure Intranet that is protected by a security perimeter 302 (such as a firewall) and an access server 306 may be located on an extranet for users inside and outside the system 202. The registry server 310 may execute operations using multiple execution threads. A browser 308 is coupled by a communication link to the network 140. The browser 308 could be a workstation computer, or an equivalent, that executes a standard World Wide Web (WWW) browser program or equivalent. The network 140 is a compatible information communication network, preferably the Internet. The browser 308 would be a client process of any convenient type, and the network 140 would be a data communication network that could transfer information between the client and a server coupled to the network.

The information access system 300 could enable remote users to register information sources (resources) and register users of the information in a central repository. A resource is a source of information, identified by a Uniform Resource Locator (URL), and published by a WWW server (or Web server), either in a static file formatted using Hypertext Markup Language (HTML), or in a dynamically generated page created by a CGI-based program. Examples of resources include a Web page, a complete Web site, a Web enabled data base, and an applet.

The information access system 300 may allow a user to log-in to the system and thereafter access one or more resources during an authenticated session. Users may log-in with a digital certificate or by opening a log-in page URL with a Web browser and entering a name and password. A successful log-in presents the user with a personalized menu that assists in identifying and selecting a resource. The user then selects and accesses the resource.

The protected server 304 in the system 300, is logically separated from the browser 308. The registry server 310 is coupled by a secure communication link 309 to the access server 306, and in turn is coupled to the network 140. The registry server 310 has a check system that manages concurrent access of multiple users or browsers. The computer 100 may contain administration application modules, a runtime module and an access control library. The administration application modules may be structured as one or more HTML pages, CGI-based Java programs, or applets.

The protected server 312 executes or supervises execution of the computer 100, by managing and registering users, resources and roles, by reading and writing information to or from the registry repository 320 which could be in the form of a structures database, such as any suitable server relational database management system. The access server 306 stores a log-in page, a client module to authenticate a user by verifying the name and password with the registry server 310. If the name and password are correct the client module reads the users roles from the registry server 310, and sends an encrypted version in a "cookie" to the user's browser. A "cookie" is a packet of data sent by Web servers to Web browsers. Each cookie is saved by the browser 308 until it expires. A cookie returned by the check system is required for access to resources protected by the system 300.

When the user selects a resource, the browser sends an open URL request and cookie to a protected Web server. A protected Web server is a Web server with resources protected by a runtime module, which decrypts information in the cookie and uses it to verify that the user is authorized to access the resource. The cookie can also be used to return information based on the user's name and roles.

The protected server 304 could be a Web server that stores on or more resources. It may cache a list of resources in a runtime module that needs to be protected. The protected server 304 may send and receive requests or messages conforming to Hypertext Transfer Protocol (HTTP). An example would be for a browser 308 to issue an HTTP request, "open the resource designated by a URL", and provide a URL as a parameter. For every HTTP request that is received, a server sets a Web server environment variable equal to the Internet Protocol (IP) address of the requesting client or server. The HTTP then calls the runtime module which runs in the same process space as the HTTP server, and passes it the browser's request. The runtime module determines whether the requested URL is a protected resource. If it is, a check system is enabled to authenticate the request.

III. Details of the Components and Operation

Figure 4:
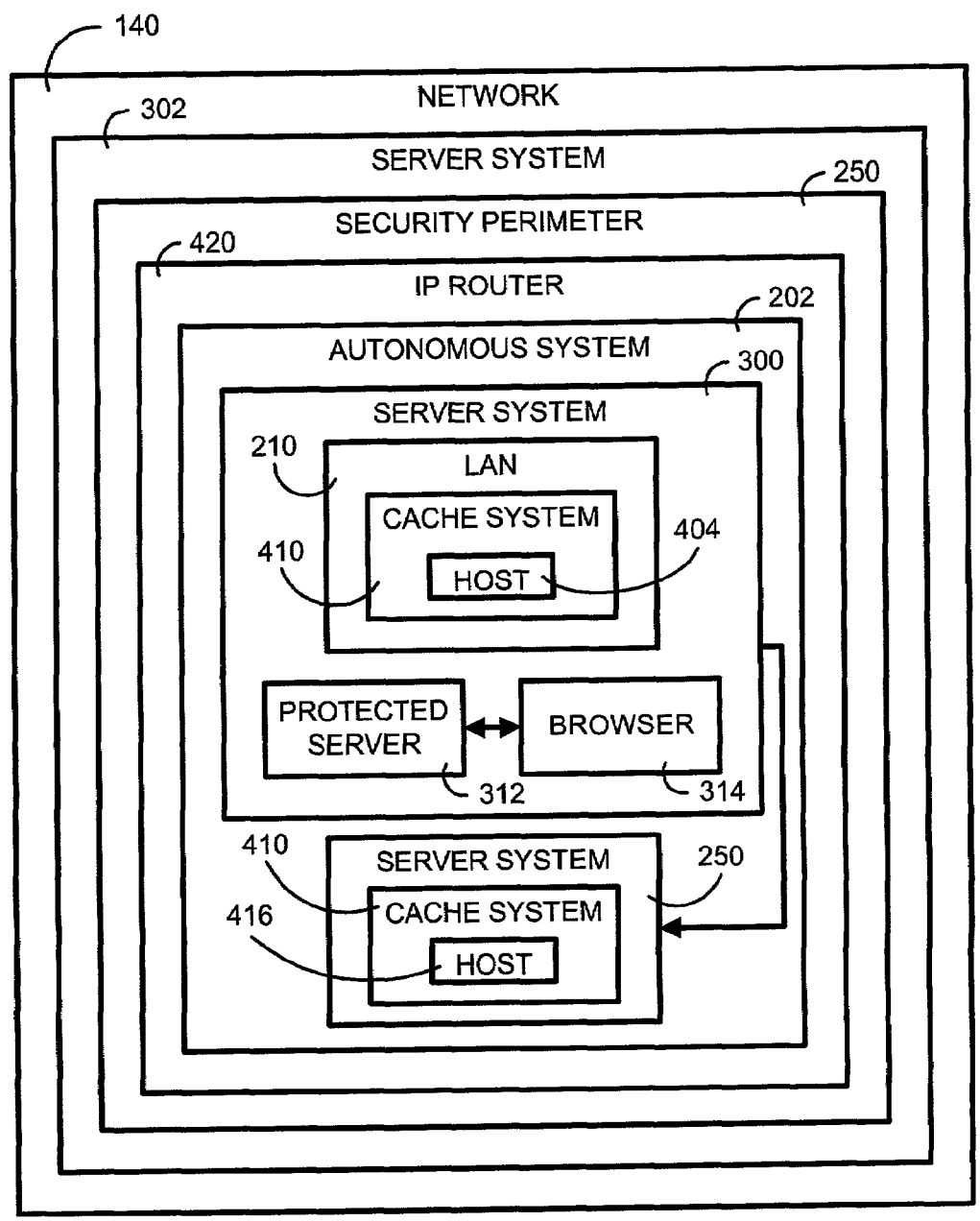
FIG. 4 is a block diagram illustrating the security system of the present invention.

FIG. 4 is a block diagram illustrating the IP router 420 in a preferred embodiment of the current invention. Referring to FIG. 4 along with FIGS. 1–3, first, an external network, LANs 210 contains hosts 1-$n$,. If a host 404 is to transmit an IP datagram, it needs to be encapsulated in a frame appropriate to the physical medium of the network. For the successful transmission of the frame it is necessary to determine the physical address of the destination computer, in this instance host 1-$n$, 416, in network 100. This can be achieved fairly simply using a table that will map IP addresses to physical addresses.

The computer can use a protocol commonly known as ARP (Address Resolution Protocol) that operates dynamically to maintain the translation table known as the ARP cache 1-$n$ which could be part of the cache system 410. The host 1-$n$ 416, determines its own physical address at boot up by examining the hardware and its own IP address from a configuration file, but it is necessary to fill the ARP cache 1-$n$. This is done by the computer making ARP broadcasts whenever it encounters an IP address that cannot be mapped to a physical address by consulting the cache. By making such requests a host can fill up its ARP cache.1-$n$.

If a host 1-$n$ 404, 416, is connected to more than one network via separate ports then a separate ARP cache will be maintained for each interface. Alternatively there will be a further entry in the ARP cache 1-$n$, associating an entry with a particular interface. Since ARP requests are broadcast, any host maintaining an ARP cache can monitor the broadcasts and extract the host's physical and IP address and update its own ARP cache as necessary. The ARP request format is designed to be capable of supporting protocols other than IP and Ethernet as long as it is possible to broadcast on the local network 202.

If the host 1-$n$ 404, 416, receives an IP datagram on any interface it will pass it to the relevant application if it was for that host, or will attempt to retransmit it on one or other of the available interfaces if it was addressed to another host.

Datagrams travel from host to host via gateways called routers. A router 420 can talk to adjacent routers, informing each other of what the routers in all the networks in the AS 202 are currently connected to. The routers must communicate using a routing protocol, routing daemon, that updates the kernel's routing table with information received from neighbor routers.

The registry server 310, manages access to the registry repository 320 by authenticating a URL (uniform resource locator), associated with the server 250, specifying the address information necessary to receive data. A URL is a standard system developed to specify the location of a resource that is available in an electronic format. Some systems and applications allow a user through a GUI to launch an appropriate client and obtain the associated resource. In the Internet, HTTP (hypertext transfer protocol) the URL is specifically designed for use with the server, the World Wide Web.

The security perimeter 302, may be defined by firewall software, routing limitations, encryption and/or other means familiar to those of skill in the art. A firewall is a heavy security layer that imposes a burden on the operation of individual computers in the network. In addition, the firewall represents a single point at which a security breach could be directed and therefore making the network system vulnerable.

Figure 5A:
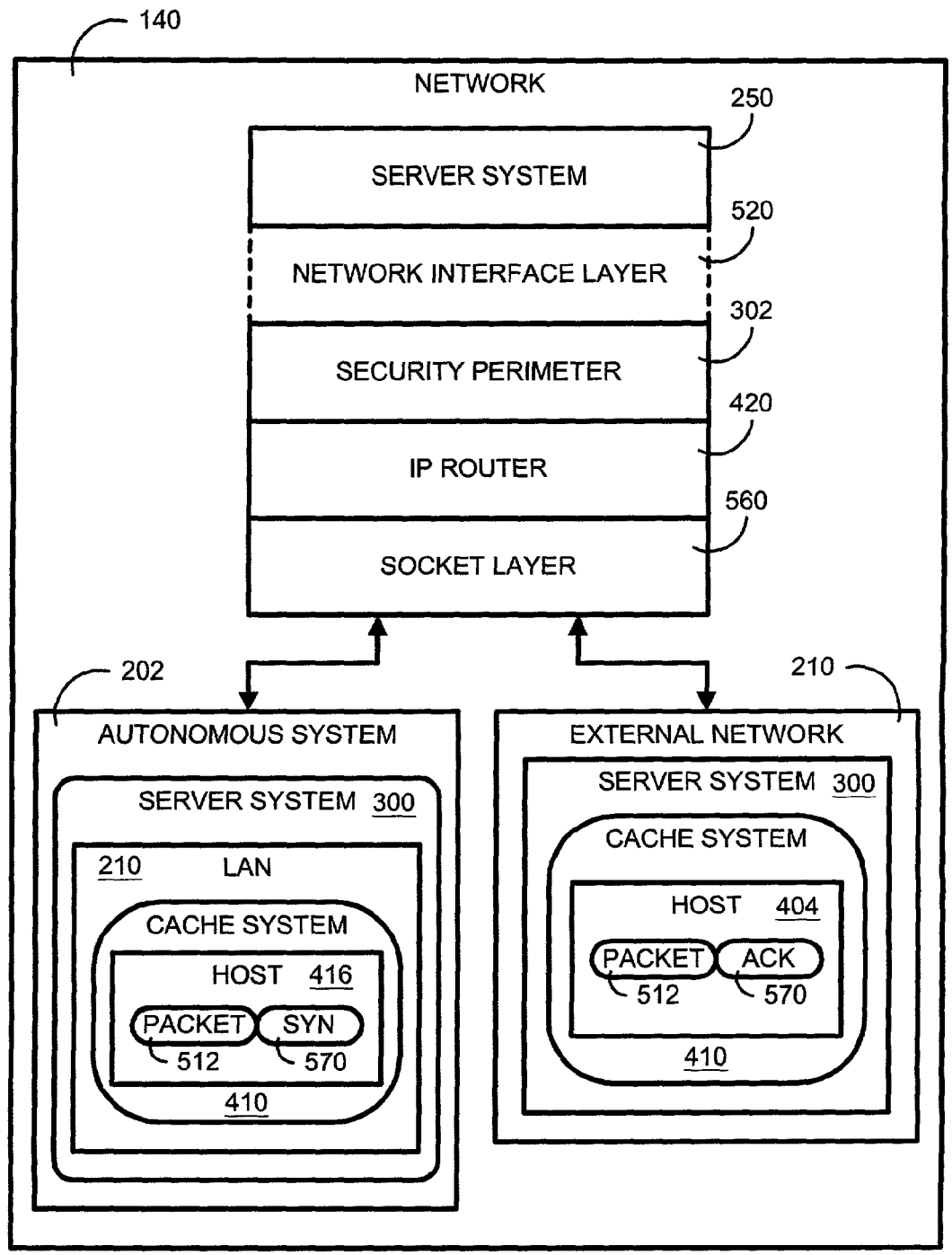
FIG. 5A is a block diagram showing connection layers between two hosts.

FIG. 5A is a block diagram illustrating the connection system between host 416 and 404 in the current invention. In the preferred embodiment, data, in the form of individual packets 512, are produced for transmission from an external network 210 from a host, originator 416. The packet 512 has a flag 570 (SYN), and a random sequence number, which together indicate a connection is requested. This passes through a socket layer 560, an IP router layer 420, a security perimeter 302 to a network interface layer 520. The packet 512 is transmitted to the target, host 404 which increments the random number by one and attaches an ACK flag 580. The source 416 replies to this communication by sending back the random sequence number incremented by one.

Figure 5B:
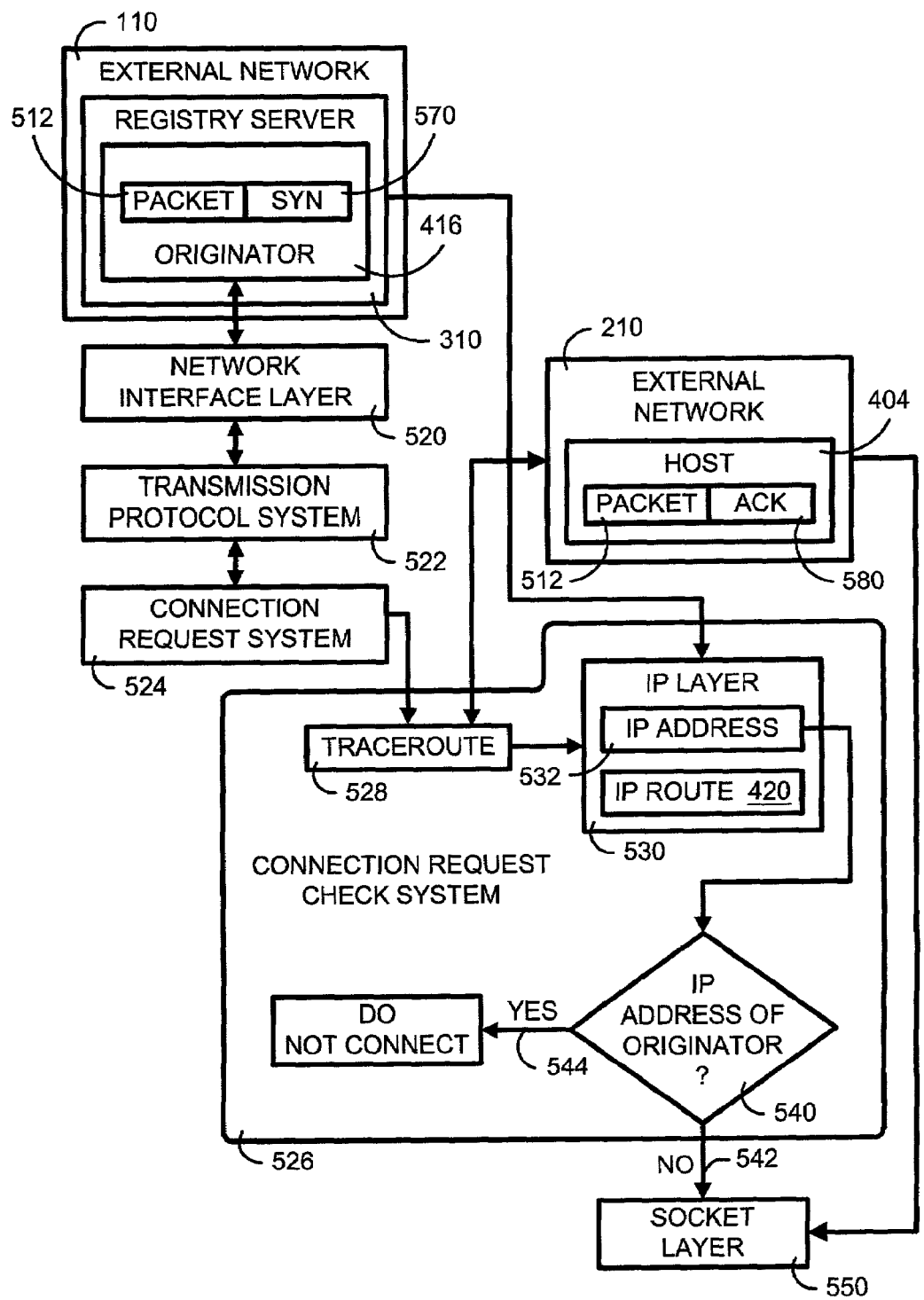
FIG. 5B is a flow chart illustrating the connection request system the present invention.

FIG. 5B is flow chart illustrating the connection request check system and a transmission protocol system 522 which may be an Internet Protocol Suite such as TCP/IP, or some other protocol, to the connection request system 524. Before the packet 512 can be transferred to the socket layer 560, in the network 140, the connection request must be granted. The system that grants the connection is the connection request check system 526. In general, the connection request check system 526 examines a route table to determine if the originator is local to the intranet or not. The route table is generated by any suitable route tracing device, such as a traceroute command 528. The traceroute 528 requests an originators address. As this Internet Control Message Protocol (ICMP) traceroute packet is routed throughout the network, and/or Internet, every route that handles this packet is asked to respond to the originator 510 reporting the routers name. The traceroute command 528 sends an ICMP packet back to the originator making the request.

The connection to the connection request system 526 is through a process called a "three way handshake". It starts with the source computer 416 sending a TCP packet 512 to a target computer 404, with the SYN flag 570 (a bit in the header) set, and a random sequence number. The SYN flag indicates that the computer wants to establish a connection. The normal response to this request is a packet with SYN and ACK flags set 580, the source's sequence number incremented by one, and the target's 404 random number. When the source 416 receives this, it responds with an acknowledgment containing the target's 404 sequence number, incremented by one. The sequence numbers provide the ends of a "conversation" with an index of the sequence of the packets 512 transferred. Each end knows that all the data has been received.

When the SYN request has been received, the target 404, should respond with the second step of the handshake, the SYN-ACK. If the port is "open" a SYN-ACK is generated. Then it confirms that a connection is potentially possible whether an actual service is available on the port. In some operating systems, the connection to the network protocol can be made by opening a socket 560 and reading and writing data to and from the socket. The socket in this case is a software object that simplifies program development as the programmer need only manipulate the socket and can rely on the operating system to transport messages across the network.

If this routing information includes the IP address 532 of a set of known IP addresses (and associated company/intranet firewall), then the security of the firewall has been breached 544. As such, the connection will not be allowed or alternatively, the user can be alerted and asked to allow or deny the connection request. If any of the IP addresses collected by the traceroute do not match the set of known IP addresses 532, then the connection of the packet 512 can be made to the socket layer 560 of the host 416.

Figure 6:
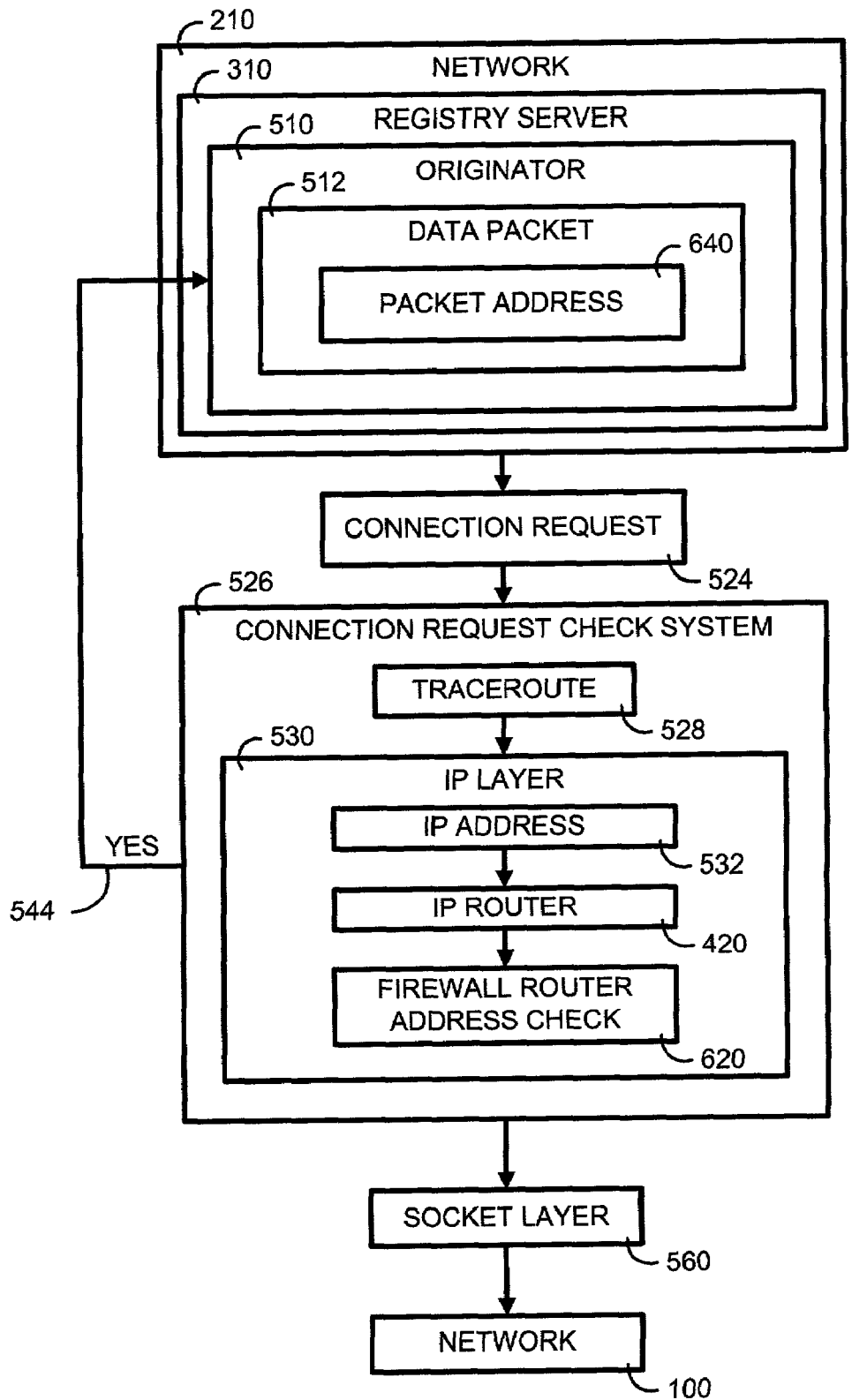
FIG. 6 is a flow chart illustrating the firewall router address check system of the present invention.

FIG. 6 is a flow chart of the firewall router address check system 620 of the present invention. Referring to FIGS. 1–5, as well as FIG. 6 the preferred embodiment of the present invention is shown. In current Internet Protocol Security Protocols (IPSEC) such as deployed by VPN Virtual Private Networks, the secure exchange of packets is supported at the IP layer. Two encryption models, Transport Mode and Tunnel Mode require a receiver, compliant to IPSEC to decrypt the packets sent. The system is a Public Key system in which the header is untouched and the data is encrypted and decrypted. In the IPSEC system it is possible to disable and enable traffic based on an IP address or subnet on a per packet basis.

In the present invention, this connection orientation based access authentication configuration reduces the IPSEC model to one address, namely, the address of the firewall router 620 at the site of the connection request 524. In the illustration in FIG. 6, a packet 512 produced by a host, originator 510 in a network 210, is forwarded to a host in the network 140. At the connection request check system 526 the traceroute 528 is activated and the firewall router address check 620 occurs in the IP router 420 in the IP layer 530. If the routing information includes a set of known IP addresses, such as the company/intranet firewall IP address 544, the connection is not allowed 542. If the IP address does not match the set of known IP addresses 542, the packet 512 can be forwarded to the network 140.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer system operating in a network environment for preventing security breaches, comprising:

an interface layer that receives at least one connection request from another computer;

a security layer that examines the connection request, gathers a list of router addresses and compares the router addresses to a set of known firewall router address; and a socket layer residing above the security layer and coupling connection requests to data stored on the computer.

2. The computer system of claim 1, wherein the security layer generates an alert to a user of the computer if one of the gathered addresses match one of the known firewall router addresses.

3. The computer system of claim 2, wherein the security layer provides the user of the computer the option to grant or deny the connection request.

4. The computer system of claim 1, wherein the security layer denies the connection request if one of the gathered addresses match one of the known firewall router addresses.

5. The computer system of claim 1, wherein the security layer uses a traceroute to gather the list of router addresses.

6. The computer system of claim 5, wherein the traceroute gathers Internet Protocol (IP) addresses of all routers between the computer system and a machine originating the connection request.

7. The computer system of claim 6, wherein the security layer resides between the socket layer and the interface layer.

8. The computer system of claim 1, wherein the security layer monitors Transmission Control Protocol (TCP) data packets for synchronization (SYN) requests.

9. A computer implemented method operating in a network environment for preventing security breaches, comprising:

receiving at least one connection request from another computer;

gathering a list of router addresses associated with the connection request;

comparing the router addresses to a set of known firewall router address; and forming a socket layer residing above the security layer and coupling connection requests to data stored on the computer.

10. The method of claim 9, further comprising alerting a user of the computer if one of the gathered addresses match one of the known firewall router addresses.

11. The method of claim 9, further comprising providing a user of the computer the option to grant or deny the connection request.

12. The method of claim 9, further comprising denying the connection request if one of the gathered addresses match one of the known firewall router addresses.

13. The method of claim 9, further comprising using a traceroute to gather the list of router addresses.

14. The method of claim 13 wherein the traceroute gathers Internet Protocol (IP) addresses of all routers between the computer system and the machine originating the connection request.

15. A computer-readable medium having computer-executable instructions operating on a computer system for validating connection requests on a networked computer, comprising:

an interface module operating on the computer that examines the connection request and collects Internet Protocol (IP) addresses of all routers between the computer and a machine originating the connection request; and a security module that compares the collected addresses to a set of known firewall router address and prevents the connection request if the any of the collected addresses match the set of known firewall addresses, wherein the security module monitors Transmission Control Protocol (TCP) data packets for synchronizing (SYN) requests.

16. The computer-readable medium of claim 15, wherein an alert is provided to a user of the computer if one of the gathered addresses match one of the known firewall router addresses.

17. The computer-readable medium of claim 15 wherein the security module provides a user of the computer the option to grant or deny the connection request.

18. The computer-readable medium of claim 15, wherein the interface module uses a traceroute to collect the router addresses.

* * * * *